April 16, 1940.  E. EGER  2,197,127
BONDING OLEFIN POLYSULPHIDE PLASTICS TO FLEXIBLE BASES
Filed March 4, 1937
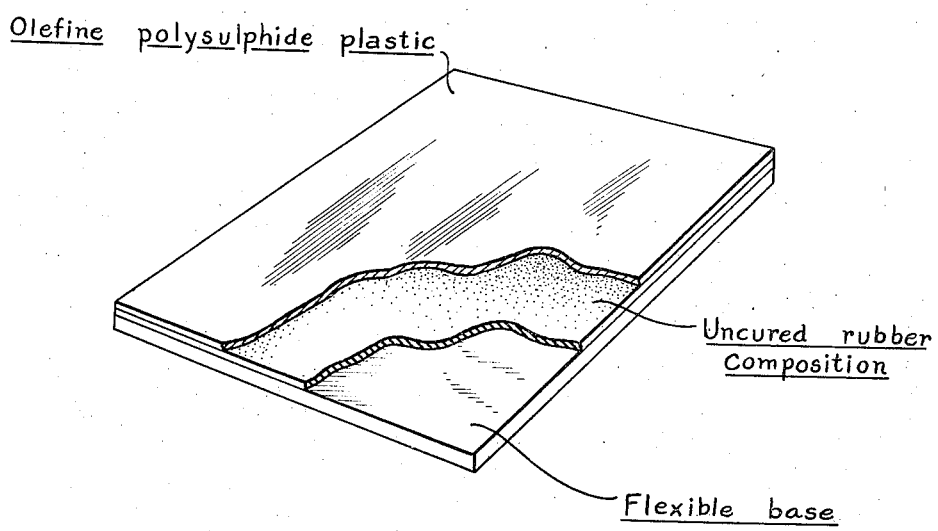
INVENTOR.
ERNST EGER
BY Gourley & Budlong
ATTORNEYS Patented Apr. 16, 1940

2,197,127

UNITED STATES PATENT OFFICE 2,197,127

BONDING OLEFIN POLYSULPHIDE PLASTICS TO FLEXIBLE BASES

Ernst Eger, Grosse Pointe Park, Mich., assignor, by mesne assignments, to United States Rubber Company, New York, N. Y., a corporation of New Jersey Application March 4, 1937, Serial No. 128,989

6 Claims. (Cl. 152—330)

This invention relates to improvements in bonding olefin polysulphide plastics to flexible bases.

An object of the invention is to provide an article normally flexible in use and embodying a flexible base, for example, rubberized fabric material, so bonded to a coating of an olefin polysulphide plastic as to avoid cracking, peeling or breaking off of the plastic coating due to flexing of the article during use.

Olefin polysulphide plastics such as those referred to in Patrick U. S. P. 2,049,974 and U. S. P. 1,981,968, and particularly the member which is known as Thiokol (believed to be ethylene polysulphide) are useful as a coating for various bases because it is substantially impervious to fluids such as water and gases. However, when applied directly to a flexible or fabricated base which undergoes various degrees of flexing under conditions of using the same, there is a tendency for the Thiokol to break up or loosen or peel off. This especially occurs where the polysulphide plastic is applied as a coating over the band ply of a tire. The band ply is a rubberized fabric on the inside of the tubeless tire, and may have one or more skim coats of vulcanized rubber. When the tire undergoes repeated flexure, various strains are set up in and surrounding the fabric, and as a result the polysulphide plastic does not remain integral with and strongly bonded to the fabricated base. While I have this problem in mind, it is to be understood that the advantages of the present invention may be applied wherever it is sought to firmly and permanently bond a substantially continuous and unbroken coating of the polysulphide plastic to a flexible foundation base which undergoes marked degrees of flexing in use.

According to the invention the fabric which may be rubberized or otherwise treated is first coated in any suitable manner as by spraying or brushing with a layer of a non-curing rubber cement, preferably one containing a resin flux. The cement is then allowed to dry to remove the rubber solvent. If desired, more than one coat of the cement may be applied. To the dry or substantially dry cement coating there is then applied the desired coating or coatings of the olefin polysulphide plastic, for example Thiokol. The dried cement acts as a strong bonding agent between the flexible base and the polysulphide plastic coating. It also acts as an elastic cushion for the polysulphide coating so as to maintain it as a solid continuous and unbroken film or layer even under the most severe flexing and heat conditions during use of the article. The general assembly is shown in the appended drawing.

The following example is given in illustration of a gum cement that serves the above purpose, although it is to be understood that the proportions of the ingredients including the rosin or its equivalent may be varied. The parts are by weight.

*Example.*—47 pounds of unvulcanized rubber, 85 lbs. of rosin, and 68 gallons of 68° solvent gasoline are treated as follows: The rubber is milled to soften it and added to the gasoline with churning until substantially completely dissolved. Then the rosin is added and the mix churned until the rosin is dissolved. The mix is then ready for use.

The method of bonding hereinabove set forth may be used when applied to other flexible articles than tires, for example it may be applied to balloon fabrics and the like and other flexible articles where it is desired to exclude or retain water, air, or other gases.

Unvulcanized or uncured rubber herein is to be understood as including not only new or raw rubber but also reclaimed rubber.

Having thus described my invention, what I claim and desire to protect by Letters Patent is:

1. An article normally freely flexible during use, embodying a flexible fabricated base rendered impervious to fluids by a substantially continuous coating of an olefin polysulphide plastic, including a binder between the said base and the plastic coating which binder is a soft elastic layer of gum composition free of vulcanizing ingredients in direct contact with said coating.

2. An article normally freely flexible during use, embodying a flexible fabricated base bonded to a fluid impervious substantially continuous coating of an olefin polysulphide plastic by means of a soft elastic dried layer of an uncured rubber cement free of vulcanizing ingredients in direct contact with said coating.

3. An article normally freely flexible during use, embodying a flexible fabricated base bonded to a fluid impervious substantially continuous coating of ethylene polysulphide by means of a soft elastic dried layer of an uncured rubber-resin cement free of vulcanizing ingredients in direct contact with said coating.

4. An article normally freely flexible during use, embodying a flexible rubberized fabric base embodying a coating of vulcanized rubber bonded to a fluid impervious substantially continuous coating of an olefin polysulphide plastic by means of a soft elastic dried layer of an uncured rubber-resin cement free of vulcanizing ingreidents in direct contact with said coating.

5. A tire the rubberized band ply of which embodies a skim coating of cured rubber adhesively bonded to a layer of a soft uncured rubber composition free of vulcanizing ingredients which gum composition in turn is directly adhesively bonded to a layer of an olefin polysulphide plastic characterized in being substantially impervious to fluids.

6. An article normally freely flexible during use, embodying a flexible fabricated base rendered impervious to fluids by a coating of an olefin polysulphide plastic and an intermediate bonding layer of a dried non-curing gum cement free of vulcanizing ingredients in direct contact with said coating between said base and coating whereby to render the said coating substantially immune to breakup on flexure of said base during use.

ERNST EGER.